Oct. 15, 1940. C. R. POST 2,217,813
ATTACHMENT FOR CARBURETORS
Filed Sept. 9, 1938 3 Sheets-Sheet 3
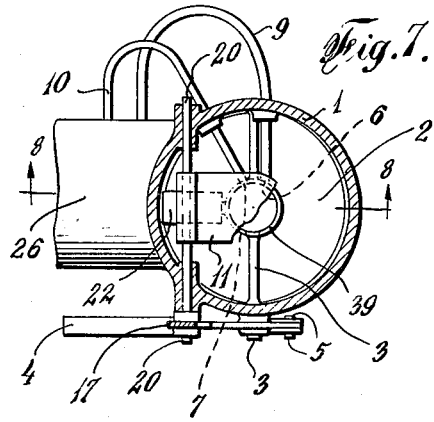
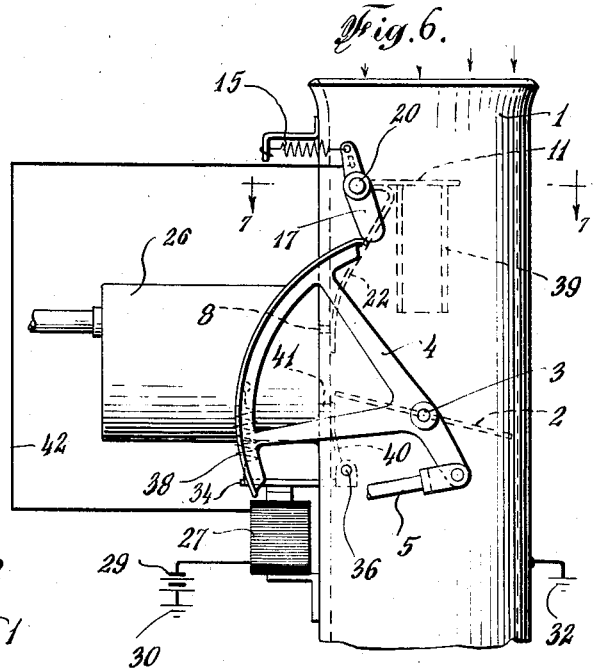
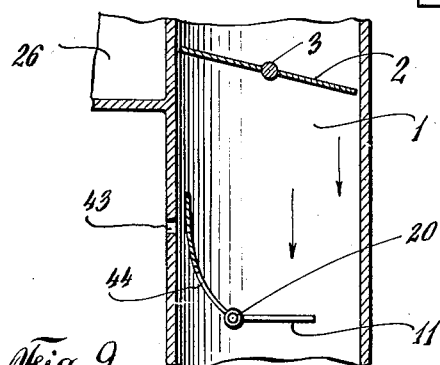
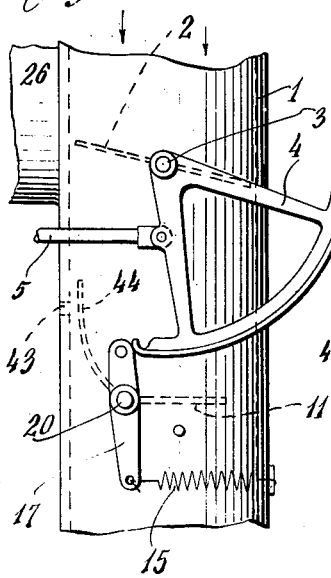
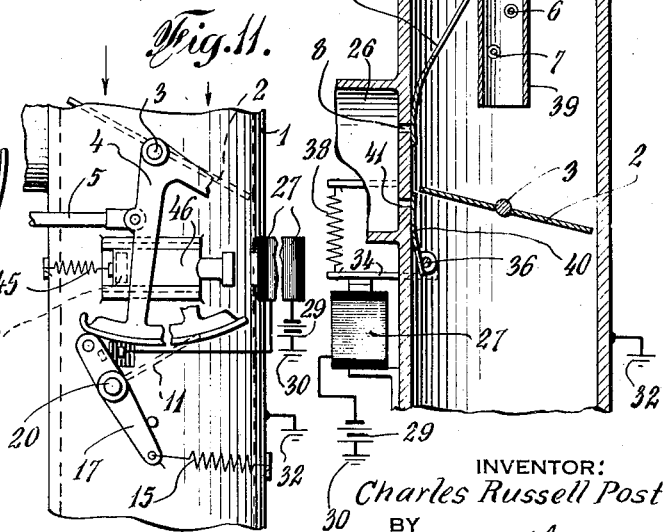
INVENTOR:
Charles Russell Post
BY
Young, Emery & Thompson
ATTORNEYS Patented Oct. 15, 1940

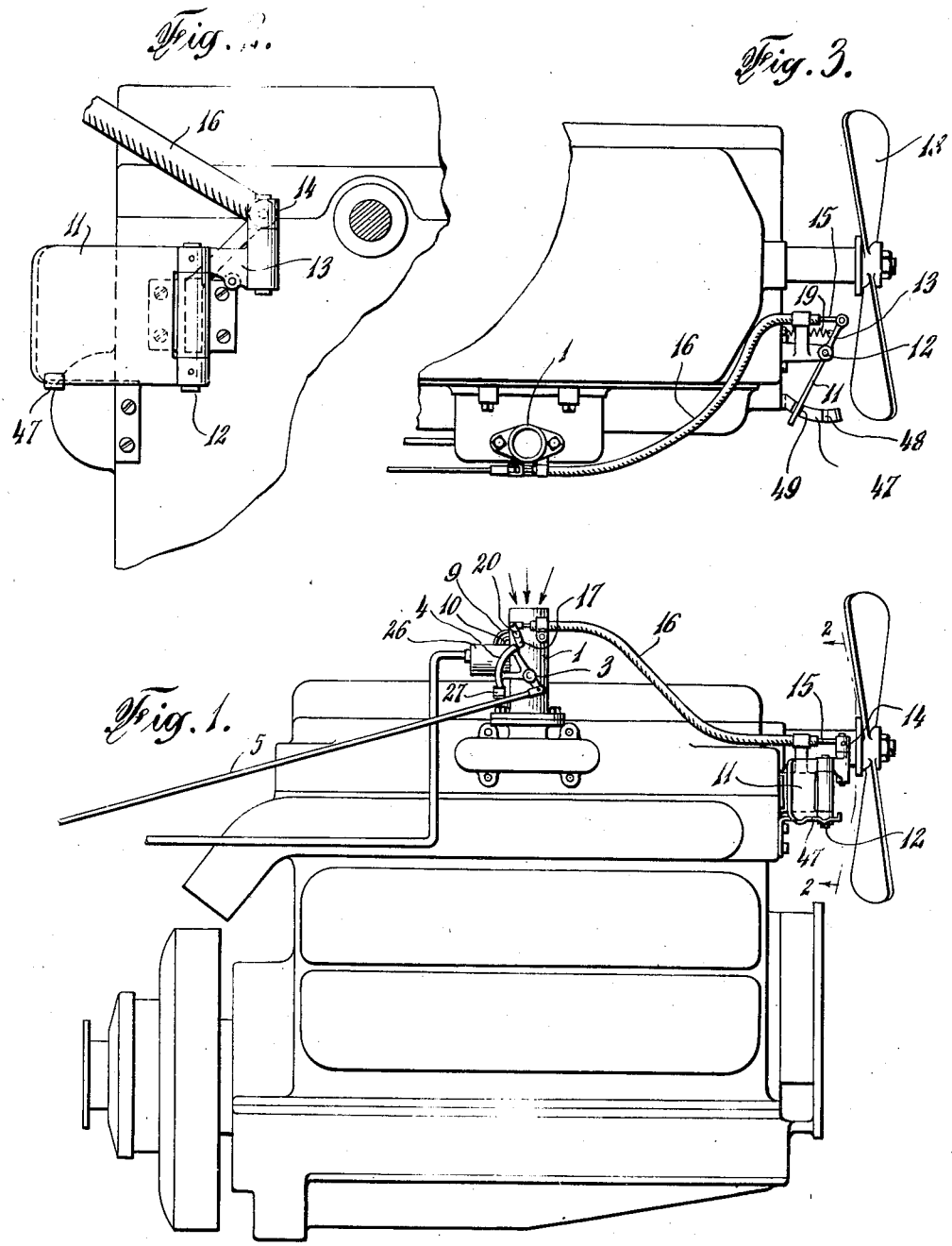

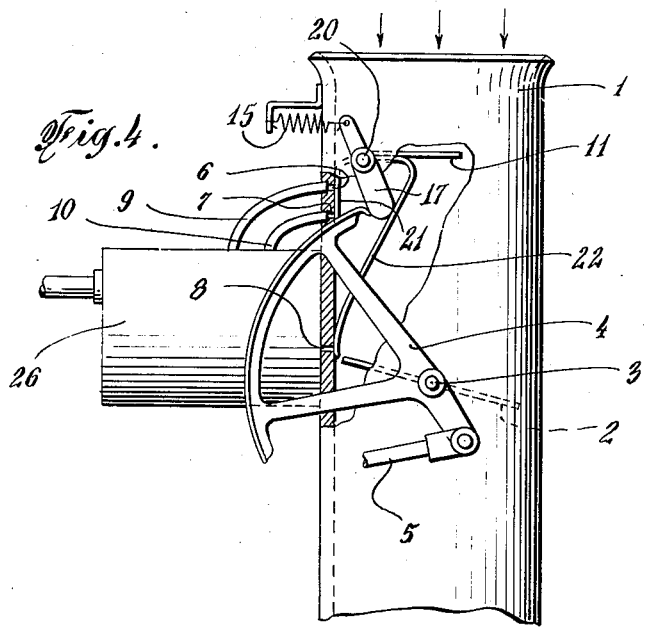
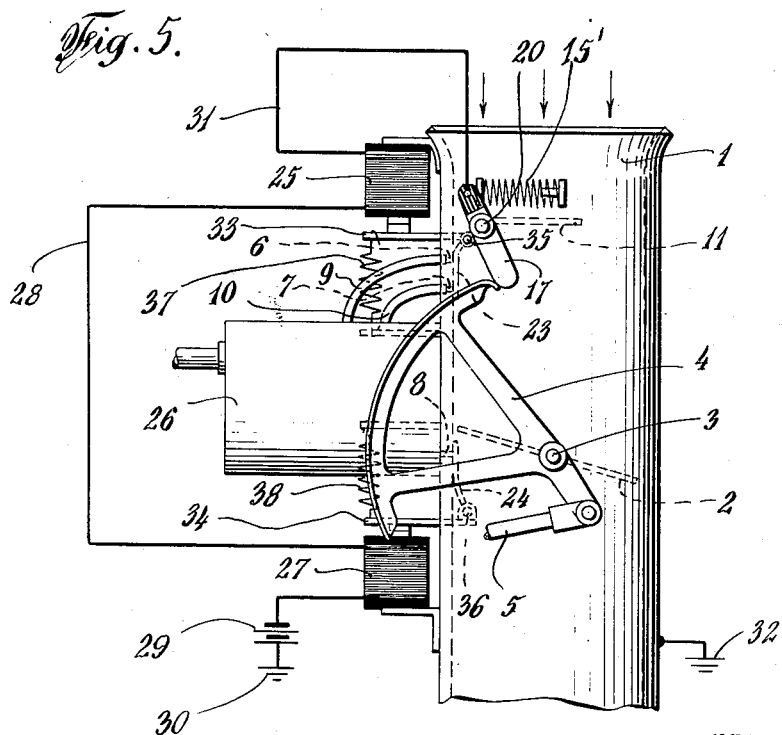

2,217,813

UNITED STATES PATENT OFFICE 2,217,813

ATTACHMENT FOR CARBURETORS

Charles Russell Post, Scarsdale, N. Y.

Application September 9, 1938, Serial No. 229,210

29 Claims. (Cl. 123—124)

The present invention relates to an apparatus and device for controlling automatically the gasoline and air mixture for internal combustion engines. It is particularly applicable to such engines when they are used as the motive power in an automobile or similar vehicle.

In the operation of such a vehicle, it is, of course, at times desirable to preserve the braking action of the engine by leaving it in mechanical engagement with the driving wheels, but it is not economical to allow gasoline to pass through the engine when no power is required from the engine. A similar condition exists when the engine is operating at a high speed and the throttle valve is suddenly closed, even though the clutch be disengaged or the transmission be in neutral position.

It is an object of the invention so to devise the mechanism that it will be possible, by mechanical or electrical means or both, to control the supply of gasoline by either partially or completely shutting off the supply of gasoline to the mixing chamber of a carburetor or to permit the admission of air to the intake manifold of said engine under certain operating conditions or to do both simultaneously. Thus, for instance, when an automobile is coasting down hill or otherwise proceeding by its own momentum, the carburetor according to the present invention permits the gas supply to be partially or completely shut off, so that the idling engine driven by the rear wheels will not be needlessly consuming gasoline.

A further object of the invention is to provide automatic means for preventing gasoline vapor from passing through the engine under certain driving conditions of a vehicle but at the same time to utilize the engine as a brake or momentum retarder.

A still further object of the invention is to accomplish the foregoing objects with the minimum of parts and without complexity of parts so that the device may be manufactured and installed economically, does not require delicate or frequent adjustment, and does not easily get out of order.

Further objects will be apparent from the following description taken in connection with the accompanying drawings in which like reference characters indicate corresponding parts and in which:

Figure 1 is a side view of my device, as applied to an internal combustion engine;

Figure 2 is a fragmentary elevational view from the front of the engine;

Figure 3 is a fragmentary plan view;

Figure 4 is a side view, partly in section, of a carburetor, with a modified form of my device applied thereto;

Figure 5 is a side view of another modified construction;

Figure 6 is a side view of still another modified construction;

Figure 7 is a cross-sectional view, taken on the line 7—7 of Figure 6;

Figure 8 is a longitudinal sectional view, taken on the line 8—8 of Figure 7;

Figure 9 is a side view of a further modified construction;

Figure 10 is a longitudinal sectional view of the modification of Figure 9; and

Figure 11 is a side view of a still further modified construction.

The various forms of the invention, which are shown by way of examples, include a conventional carburetor structure of the down-draft type with a vertical mixing chamber or casing 1, open at the top end and having the usual throttle valve 2 rotatably mounted therein on a shaft 3. The shaft 3 extends outside of the casing 1 and has a cam member 4 mounted thereon. The usual connecting rod 5 connects the throttle valve 2 with the usual throttle lever and accelerator pedal of an automobile. The arrows indicate the direction of the air flow in the casing 1. This air flow operates to draw gasoline or other fuel through the vents 6, 7, and 8, from the float chamber 26, vents 6 and 7 being connected with the float chamber by pipes 9 and 10, respectively.

The preferred construction, as shown in Figure 1, operates as follows:

A blade or vane 11 is rotatably mounted on a shaft 12, which, in turn, is rigidly mounted on the engine adjacent the front end thereof. The vane 11 has an extension 13, rigidly fastened to the vane and extending on the opposite side of the shaft 12. Connected to a sleeve 14, which is associated with the extension 13 of the vane 11, is a flexible wire 15, which extends through a flexible guiding cable 16, to the carburetor. The carburetor end of the wire 15 is connected to one end of a lever 17, the function of which will be hereinafter described. The vane 11 is preferably so placed with respect to the fan 18 of the cooling system of the engine that it lies in the path of the current of air that is driven back against the engine by the fan.

It will be understood that the air pressure upon the vane, when located as above described, will largely depend upon the speed at which the fan is rotating, i. e., the speed of rotation of the engine. Affixed to the extension 13, which is associated with the vane 11, is a tension spring 19, the other end of which is affixed to the engine or other fixed support. Thus, normally, the vane 11 lies in a plane which is parallel to the plane of rotation of the fan. The tension of the spring 19 is so adjusted, however, as to permit the air pressure, caused by the rotation of the fan, to cause the vane, under conditions to be hereinafter described, to assume the position shown in Figures 1 and 3, when the engine, and therefore the fan, is rotating at comparatively high speed.

It will be understood that when the throttle valve is open and the engine is generating power, the free flow of fuel to the engine is desired. At such times, it is essential that my device be made positively inoperative. This is accomplished by providing the above mentioned cam 4, which is operated by the rod 5, which also operates the throttle valve 2. The cam 4, working in conjunction with the lever 17, positively throws my device out of operation when the throttle valve is in any position except the closed position. In Figure 1, the positions of the elements are those which are assumed when the throttle valve is closed. It will be seen therefrom that, under those conditions, the vane 11 is free to assume either the position parallel with the plane of rotation of the fan or the position shown in Figures 1 and 3. This is because the lever 17 is pivoted on an axis, indicated in Figure 1 at 20. With the vane in the operative position of Figures 1 and 3, the lower end of the lever 17 takes a position which is adjacent the cam 4. When the air pressure on the vane is reduced and the vane is drawn by the spring 15 back to the parallel position, the lower end of the lever 17 moves away from the cam, thus rotating the shaft 20 in a counter-clockwise direction.

When the throttle valve is opened by movement of the rod 5 toward the left (as shown in Figure 1), the cam 4 rotates in a clockwise direction, and therefore moves the lower end of the lever 17 to the right. Through the action of the lever and of the flexible wire 15, the vane 11 is then positively held in its inoperative position, i. e., in the position in which it is parallel to the plane of rotation of the fan.

As a result of the foregoing mechanism, the vane 11 is free to operate when the throttle valve is closed, but, on the other hand, is positively held in inoperative position when the throttle valve is open.

The lever 17 is positively affixed to the shaft 20, with which it rotates. Also positively affixed to the shaft 20 are suitable means, such as the valve elements 21 and 22 (see, for example, Figure 4), to control the combustibility of the gaseous current that flows to the intake manifold of the engine. When the throttle valve 2 is in the closed position but the engine is nevertheless rotating at comparatively high speed (as when it is being used to brake the speed of the vehicle), the vane 11 is affected by the pressure of the air flow from the fan 18 so as to rotate (through the flexible wire 15 and lever 17) the shaft 20, in a clockwise direction, thereby closing the vents 6, 7, and 8, by means of the valve elements 21 and 22, mounted on the shaft 20. The air flow from the fan affects and operates the vane 11 against the resistance of spring 15 which is of predetermined strength, its strength being determined according to the reduced rate of engine speed at which it is desired again to open gasoline vents 6, 7, and 8, in order to avoid engine stalling. It will, of course, be understood that it will ordinarily be preferable to provide means (not shown), such as an adjusting screw, for adjusting the tension of the spring 15. When the vehicle is traveling at a speed of 10 to 15 miles an hour, with corresponding engine speed, or when the engine speed has been reduced to a similar extent, as the result of throwing out the clutch, the air pressure on the vane 11, resulting from rotation of the fan, is reduced to a predeterminable amount; the strength of the spring 15 is so adjusted that, at such engine speed, the pressure of the air flow on vane 11 will not be sufficient to overcome the tension of the spring 15, and the tension of the spring will cause a counter-clockwise movement of the shaft 20 and lever 17, which will cause the gasoline vents 6, 7 and 8 to be uncovered by the valve elements 21 and 22. In this manner, stalling of the engine will be prevented. If at any time the accelerator pedal is operated to open the throttle valve 2, regardless of the speed of the engine or the degree of speed at which the throttle valve is opened, the cam 4 operates, through the lever 17, to rotate the shaft 20 in counter-clockwise direction and to open and hold open the gasoline vents 6, 7, and 8, so long as the throttle valve 2 is open. During the normal operation of the vehicle, when it is being propelled by the engine, the throttle valve 2 is open and the cam 4 is always in contact with the lever 17, so that the valve members 21 and 22 are lifted and the vents 6, 7, and 8 opened. It is, of course, obvious that the valve members 21 and 22 can be increased or reduced in number and can have any desired shape or configuration, according to the location of the vents 6, 7 and 8, or whatever vents the carburetor may be provided with.

Under certain conditions, it has been found that the vane 11 tends to flutter between its two extreme positions. To overcome this tendency, it is desirable to provide a spring member 47 which is provided with two grooves or channels 48, 49. The channel 48 is so located as to engage the vane 11 when the latter assumes the position parallel to the plane of rotation of the fan 18; the channel 49 is so located as to engage the vane when the latter assumes its other extreme position, i. e., the position in which the valve elements 21 and 22 close the gasoline vents 6, 7, and 8. Of course, the resiliency of the spring member 47 must be carefully coordinated with the tension of the spring 19 to insure the vane's shifting from one extreme position to the other as the air pressure thereon increases above or falls below the pressure corresponding to the engine speed at which it is desired that the valve elements 21 and 22 shall either open or close.

The arrangement of my device, as above described, is my present preferred form thereof. In order that the scope of my invention may be better understood, I will now describe several modified forms thereof.

In the construction shown in Figure 4, the blade or vane 11 is located within the casing 1 of the carburetor and is mounted directly on the shaft 20. In this arrangement, it is the air flow through the casing 1 that affects and operates the vane 11 against the resistance of the spring 15. For a given setting of the throttle valve, the rate of air flow through the casing 1 is always the same, at a given engine speed, the two varying in relationship with the rate of air flow through the casing 1, governed by the suction of the engine at a given speed. The adjustment of the tension of the spring 15 is therefore made in accordance with principles similar to those applicable to the arrangement of my invention that is shown in Figures 1, 2 and 3.

In the construction shown in Figure 5, the valve members 23 and 24 are likewise operated to open and close gasoline vents 6, 7 and 8 and are actuated under similar circumstances by the pressure of the air flow on vane 11. However, instead of being operated mechanically as in Figures 1 to 4, the valve members 23 and 24 in Figure 5 are operated by electro-magnetic means. This latter consists of two coils 25 and 27 which are connected in series by means of a wire 28. The other end of coil 27 is connected to a battery 29 (which may be the standard storage battery of an automobile) and the latter to ground 30. The other end of coil 25 is connected by means of wire 31 to an insulated contact on lever 17 which closes the circuit with a stationary contact, not shown, on the outside of casing 1 when vane 11 is affected by the air flow in casing 1. Casing 1 is grounded at 32 to complete the circuit. In this construction, vents 6 and 7 are controlled by the valve member 23 and the vent 8 is controlled by a valve member 24. Such valve members 23 and 24 are operated by armature levers 33 and 34, respectively, by means of shafts 35 and 36 extending through the casing 1 and are held open by springs 37 and 38 when the coils are de-energized. The operation of this construction is the same as the construction shown in Figures 1 to 4, in that, with the parts as shown in Figure 5, when the throttle valve 2 is closed, the pressure of the air flow on vane 11 rotates shaft 20 and lever 17 clockwise to bring the electric contacts on such lever and on casing 1 together, thereby closing the circuit energizing coils 25 and 27 to pull armature levers 33 and 34 and thereby cause valve members 23 and 24 to close the vents 6, 7 and 8. When the speed of the vehicle drops below 10 to 15 miles an hour (or when the engine speed is correspondingly reduced by throwing out the clutch), the pressure of the air flow on the vane 11 is not sufficient to overcome the force in compression spring 15', so that lever 17 rotates counterclockwise in order to break the electric circuit between the contacts, one on the casing 1 and the other on the arm 17. This will de-energize coils 25 and 27 so that springs 37 and 38 will pull the armature levers 33 and 34 away from the coils and thus open the valve members 23 and 24. It is, of course, obvious that suitable stops should be provided in order to limit the movement of the armature levers 33 and 34 away from their coils so as not to be out of range of their magnetic fields when the coils 25 and 27 are again energized. Likewise, as in the arrangements of Figures 1 to 4, when the accelerator pedal is used to open the throttle valve 2, the cam member 4 will maintain the lever 17 in such a position that the contacts are disconnected.

The construction shown in Figures 6, 7, and 8 shows a modification in which the pressure of the air flow on vane 11 also actuates all valve members to close the various gas jets or vents, but in this construction some of such valve members are controlled mechanically and another electromagnetically. In this construction, gasoline pipes 9 and 10, leading from the float chamber 26, are shown as terminating in vents 6 and 7 in the interior of a tube 39 open at both ends and located in the interior of casing 1, instead of terminating in vents in the inner wall of casing 1 as shown in Figures 4 and 5. In this construction vane 11 itself acts as a valve member to shut off the top open end of the tube 39 so that the interior of such tube will not be affected by the air flow through the casing 1 when vane 11 is in closed position. As in Figures 4 and 5, vane 11 is rotatably mounted on shaft 20 which extends through the casing 1 and has a lever 17 mounted on one end of such shaft. Also mounted on shaft 20 is valve member 22 controlling mechanically gas vent 8. Armature lever 34, held open by spring 38 when the coil 27 is de-energized, operates by means of shaft 36 the valve member 40 which controls vent 41. The coil 27 is connected at one end to a battery 29 and the latter to ground 30 and the other end of the coil is connected by wire 42 to an insulated contact on lever 17 which closes the circuit with a stationary contact on the outside of casing 1 when vane 11 is affected by the air flow. As in Figure 5, casing 1 is grounded at 32 to complete the circuit. The operation of the construction shown in Figures 6, 7, and 8 is similar to a combination of the operations of the constructions shown in Figures 1 to 5 in that, with the parts as shown in Figures 6, 7, and 8, when the throttle valve 2 is closed, the pressure of the air flow on vane 11 operates against the resistance of spring 15, of predetermined strength, to rotate shaft 20 and lever 17 clockwise, thereby closing mechanically vent 8 by means of valve member 22 and preventing the suction of gasoline through vents 6 and 7 by the operation of vane 11 in closing the top open end of tube 39 and, by means of the electrical contacts on lever 17 and casing 1, closing the circuit energizing coil 27 to cause valve member 40 to close vent 41. When the engine speed has been reduced to a predetermined rate by reduction of the vehicle speed or by throwing out the clutch, the resistance of spring 15 will overcome the pressure of the air flow on vane 11 so as to rotate shaft 20 and lever 17 counter-clockwise and open all vents, vents 6 and 7 being made to function through the re-admission of air flow or suction through tube 39, vent 8 being opened by the counter-clockwise movement of valve member 22, and vent 41 being opened by action of spring 38 on armature lever 34 when the coil 27 is de-energized by the breaking of the electrical contact between lever 17 and casing 1. In similar manner, all gas valves will be opened and allowed to function through action of the cam member 4 on lever 17 when and while throttle valve 2 is open. As in Figure 5, a suitable stop should be provided in order to limit the movement of armature lever 34 to keep it within the range of the magnetic field of coil 27. The size and position of tube 39 and the number and location of the vents opening into the same, as well as the number and position of the vents opening directly in the interior wall of casing 1, will vary according to the design of various carburetors and the number, location, configuration, and means of operation of the various valve members should be varied accordingly, by variations of the constructions shown in Figures 4 to 8.

The constructions shown in Figures 9, 10 and 11 show modifications in which the pressure of the air flow on vane 11 is used, when the throttle valve 2 is closed, to actuate the opening of at least one air vent 43, located in casing 1 or at any convenient position in the intake manifold, to admit air (unmixed with gasoline) on the engine side of the throttle valve 2. In Figures 9 and 10, this is shown as being done mechanically by means of a valve member 44, mounted on shaft 20, which opens the air vent 43 when the pressure of the air flow on vane 11 causes the shaft 20 and lever 17 to move clockwise against the resistance of spring 15. In Figure 11, the closing of the air vent 43 is shown as being accomplished by the resistance of spring 45 on slide valve 46 when coil 27 is de-energized by the breaking of the contact between lever 17 and casing 1 due to the opening of the throttle valve 2 (which causes the cam member 4 to lock the lever 17 and vane 11 out of operation) or due to the air pressure on the vane falling below the predetermined amount. When the vehicle is coasting or proceeding under its own momentum, with corresponding engine speed, the pressure of the air flow on vane 11 causes it to open the air vent 43 until reduced engine speed causes the predetermined strength of spring 15 so to act on vane 11 as to make it cease to operate or until the opening of the throttle valve 2 and the action of cam member 4 prevents vane 11 from operating. It is obvious that the admission of air through vent 43 either into the casing 1 or to the intake manifold below the throttle valve 2 will decrease the amount of air or of gasoline and air mixture passing the throttle valve 2 in its closed position and will assist in reducing the gasoline consumption when the vehicle is proceeding under its own momentum. The automatic control of the admission of air on the engine side of the throttle valve, as shown by Figures 9 and 10 or 11, may be used either alone or in combination with the automatic control of the admission of gasoline to the mixing chamber, casing 1, as shown by Figures 1 to 8.

It will of course be understood that many modifications and variations may be made in the form and arrangements of the parts constituting my improved device without departing from the spirit of my invention. As instances, I may mention the following: the valve elements 21, 22, 23, 24, etc., may take any desired form that will accomplish the intended purpose of the particular valve—that is, either the reduction or the shutting off of the supply of fuel to the engine or the introduction of air through an auxiliary air port; similarly, any other suitable means may be substituted for the cam and lever means for positively operating the valve elements when the throttle valve is opened; etc. Furthermore, the representation of my invention is largely diagrammatic; also, its application to a down-draft carburetor is merely illustrative and it will be understood that my invention may be applied to any type of carburetor, vaporizer, or similar device. I accordingly desire protection for all such modifications, variations, and applications of my invention as may come within the scope of the appended claims.

Having described my invention in sufficient detail to enable its practice by one skilled in the art, I claim:

1. A device of the kind described comprising in combination an internal combustion engine, an intake manifold therefor, a throttle valve associated therewith, means for supplying a mixture of air and a combustible vapor to said manifold, control means operable by a gaseous current to reduce the combustibility of said mixture, and positive and unyielding means for holding said control means in inoperative condition when said throttle valve is open.

2. A device of the kind described comprising in combination an internal combustion engine, an intake manifold therefor, a throttle valve associated therewith, means for supplying a mixture of air and a combustible vapor to said manifold, control means operable by a gaseous current to reduce the combustibility of said mixture, and positive means for holding said control means in inoperative condition when said throttle valve is open, said control means being composed of a movable vane and a valve connected thereto and operating upon the supply of combustible vapor to said manifold.

3. A device of the kind described comprising in combination an internal combustion engine, an intake manifold therefor, a throttle valve associated therewith, means for supplying a mixture of air and a combustible vapor to said manifold, control means operable by a gaseous current to reduce the combustibility of said mixture, and positive means for holding said control means in inoperative condition when said throttle valve is open, said control means being composed of a movable vane, a solenoid, a valve operated by said solenoid, and means associated with said vane for opening and closing an electric circuit through said solenoid.

4. A device of the kind described comprising in combination an internal combustion engine, an intake manifold therefor, a throttle valve associated therewith, means for supplying a mixture of air and a combustible vapor to said manifold, control means operable by a gaseous current to reduce the combustibility of said mixture, and positive means for holding said control means in inoperative condition when said throttle valve is open, said control means comprising a valve operating upon the supply of combustible vapor and means for closing said valve when the engine speed exceeds a predetermined minimum value.

5. A device according to claim 1 in which said control means comprises a valve which, when open, admits an auxiliary supply of air to said manifold, and means for opening said valve when the engine speed exceeds a predetermined value.

6. A device of the kind described comprising in combination an internal combustion engine, an intake manifold therefor, a throttle valve associated therewith, means for supplying a mixture of air and a combustible vapor to said manifold, control means operable by a gaseous current to reduce the combustibility of said mixture, and positive means for holding said control means in inoperative condition when said throttle valve is open, said engine being provided with a cooling fan and said control means comprising a movable vane located in the current of air created by said fan.

7. A device according to claim 1 in which said control means comprises a movable vane located in the flow of gaseous current to or through said manifold.

8. A device of the kind described comprising in combination an internal combustion engine, an intake manifold therefor, a throttle valve associated therewith, means for supplying a mixture of air and a combustible vapor to said manifold, means for creating a gaseous current, said means varying in effectiveness when the speed of the engine varies, control means operable by said gaseous current to reduce the combustibility of said mixture, and means for positively holding said control means in inoperative condition when said throttle valve is open.

9. A carburetor comprising a chamber having an aperture opening thereinto, a throttle valve in the chamber, a valve member adapted to open and close said aperture, a vane movably mounted in the path of a gaseous current which varies when the speed of the engine varies, a cam member for positively maintaining the valve in one position when the throttle valve is opened, and means for automatically actuating the valve when the pressure of the gaseous current on the vane reaches a predetermined value and when the throttle valve is closed.

10. A device of the kind described comprising in combination an internal combustion engine; intake ports for the cylinders thereof; an intake manifold communicating with said ports; a throttle valve associated therewith; means for operating said throttle valve; a reservoir of combustible fluid; a passage for such fluid, communicating with said manifold; an intake port for air, communicating with said manifold; a movable vane located in the path of a gaseous current which varies when the speed of the engine varies; a valve for said fluid passage, said valve being operated by the motion of said vane; means associated with said throttle valve for holding said fluid-passage valve open when said throttle valve is open; said vane operating to close said fluid-passage valve when the throttle valve is closed and the speed of the engine exceeds a predetermined value; and means for opening said fluid-passage valve when the speed of the engine falls below said predetermined value.

11. A device of the kind described comprising in combination an internal combustion engine; intake ports for the cylinders thereof; an intake manifold communicating with said ports; a throttle valve associated therewith; means for operating said throttle valve; a reservoir of combustible fluid; a passage for such fluid, communicating with said manifold; an intake port for air, communicating with said manifold; a movable vane located in the path of flow of a gaseous current which varies when the speed of the engine varies; an auxiliary air port communicating with said manifold; a valve for said auxiliary air port, said valve being operated by the motion of said vane; means associated with said throttle valve for holding said air-port valve closed when said throttle valve is open; said vane operating to open said air-port valve when the throttle valve is closed and the speed of the engine exceeds a predetermined value; and means for closing said air-port valve when the speed of the engine falls below said predetermined value.

12. A carburetor for internal combustion engines comprising in combination a mixing chamber; a throttle valve therein; a fluid-supply aperture communicating with said chamber; a control valve therefor; means for operating said control valve comprising a movable vane located in the path of flow of a gaseous current which varies when the speed of the engine varies; and means for holding said control valve open when said throttle valve is open; the motion of said vane, when the throttle valve is closed, being controlled by the flow of said gaseous current whereby said control valve is closed and the supply of fluid through said aperture is cut off at times when the throttle valve is closed and the speed of the engine exceeds a predetermined value.

13. A carburetor for internal combustion engines comprising in combination a mixing chamber; a throttle valve therein; an air port communicating with said chamber on the engine side of said throttle valve; a control valve for said air port; means for operating said control valve comprising a movable vane located in the path of flow of a gaseous current which varies when the speed of the engine varies; and means for holding said control valve closed when said throttle valve is open; the motion of said vane, when the throttle valve is closed, being controlled by the flow of gaseous current past said vane whereby said control valve is opened and an additional volume of air is fed to said mixing chamber at times when the throttle valve is closed and the speed of the engine exceeds a predetermined value.

14. A device of the kind described, comprising a casing having a throttle valve associated therewith and at least one fuel jet opening thereinto, a valve for the fuel jet, an air flow actuated vane in operative communication with the fuel valve, means for positively maintaining the fuel valve in open position when the throttle valve is actuated to an open position, and means for automatically opening the fuel valve when the air flow pressure on the vane falls below a minimum.

15. A device according to claim 14, in which the first-mentioned means includes a cam member connected to operate with the throttle valve.

16. A device of the kind described, particularly for engines, comprising a casing having a throttle valve associated therewith and a fuel jet opening thereinto, a valve for the fuel jet, means for positively maintaining the valve in open position when the throttle valve is actuated to open position, electro-magnetic means for maintaining the valve in closed position, a vane movably mounted in the path of an air flow which varies when the speed of the engine varies, and means for placing the electro-magnetic means in an inoperative state when the speed of the engine falls below a predetermined value.

17. A device of the kind described, particularly for engines, comprising a casing having a throttle valve associated therewith and a fuel jet opening thereinto, a valve for the fuel jet, means for positively maintaining the valve in open position when the throttle valve is actuated to open position, mechanical means for maintaining the valve in closed position, a vane movably mounted in the path of an air flow which varies when the speed of the engine varies, and means for placing the mechanical means in an inoperative state when the speed of the engine falls below a predetermined minimum.

18. A device of the kind described, particularly for engines, comprising a casing having a throttle valve associated therewith and a plurality of fuel jets opening thereinto, a valve member for each fuel jet opening, a vane movably mounted in the path of an air flow which varies when the speed of the engine varies and in operative connection with one of the valve members to close the valve member, electro-magnetic means for closing another valve member, means for actuating the valve members to open positions when the throttle valve is actuated to open position, and means for automatically opening the valve members when the speed of the engine falls below a predetermined minimum.

19. A device of the kind described, comprising a casing having a throttle valve associated therewith, an open-ended tube in said casing, a fuel jet communicating with the interior of said tube, a vane movably mounted in the casing and co-operating with the tube to close one end thereof, means for automatically lifting the vane from the end of the tube when the air flow through the casing creates a pressure below a predetermined minimum, and means for maintaining the vane in open position when the throttle valve is opened.

20. A device of the kind described, comprising a casing having a throttle valve associated therewith and a plurality of fuel jets opening thereinto, an open-ended tube in said casing with which at least one of the fuel jets communicates, a vane movably mounted in the casing and co-operating with the tube to close one end thereof, a valve for another of said fuel jets mounted in said casing, electro-magnetic means for maintaining said valve closed, means for automatically lifting the vane from the end of the tube and for rendering the electro-magnetic means inoperative when the air flow through the casing creates a pressure below a predetermined minimum, and means for maintaining the vane in open position and the valve open when the throttle valve is opened.

21. A device according to claim 20, in which a valve is also secured to the vane to open and close another fuel jet and operative with the vane.

22. A device of the kind described, particularly for engines, comprising a casing having a throttle valve rotatably mounted therein and an air vent in the casing, a valve mounted in the casing to open and close the vent, a vane associated with the valve adapted to operate the same and extending into the path of an air flow which varies when the speed of the engine varies, means tending to close the air vent valve, and means for locking the air vent valve in closed position when the throttle valve is opened, said vane being of such size as to maintain the air vent valve open against the operation of the means tending to close it, when the pressure of the air flow on said vane exceeds a predetermined minimum.

23. A device according to claim 22, in which the means tending to close the air vent valve includes a member operatively connected to the vane and a spring secured at one end to the member and at the other end to the casing.

24. A device according to claim 22, in which the means tending to close the air vent valve includes a lever mounted to rotate when the vane rotates and a spring secured at one end to the lever and at the other end to the casing, and in which the means for locking the air vent valve in closed position comprises a cam member rotatable with the throttle valve, which cooperates with the lever.

25. A carburetor for an engine comprising a casing having a throttle valve rotatably mounted therein and having an air port therein, a rotatably mounted vane which is influenced by an air flow which varies when the speed of the engine varies, a lever mounted to rotate when the vane rotates, a pair of electric contacts, one stationary and the other on the lever, a valve for opening and closing the air port, an electro-magnet for opening the valve, and means for closing the valve when the pressure of the air flow on the vane is reduced to a predetermined minimum.

26. A carburetor according to claim 25, in which a cam member is provided mounted to rotate with the throttle valve to actuate the lever to break the contacts and permit the air port valve to close by said means.

27. A carburetor according to claim 25, in which the valve comprises a slide member, and the means for closing the valve comprises a spring.

28. A carburetor comprising a casing through which air is drawn and having a throttle valve therein and gas ports, a valve rotatably mounted in the casing to close and open the ports, a vane rotatable with the valve and in the path of the air flow through the casing, a lever rotatable with the valve and vane and mounted on the outside of the casing, means for operating the throttle valve including a cam member adapted to co-operate with the lever to actuate the valve a distance from the ports when the throttle valve is opened, and a spring connected at one end to the casing and at the other end to the lever to actuate the valve a distance from the ports, said spring being of a strength determined by that pressure of the air flow at which it is desired that the vane shall rotate.

29. A carburetor for an engine comprising a chamber having an aperture opening thereinto, a throttle valve in the chamber, a valve member rotatably mounted in said chamber and adapted to open and close said aperture, a vane rotatably mounted in the path of an air flow which varies as the speed of the engine varies, means for positively maintaining the valve in one position when the throttle valve is opened, and means for automatically actuating the valve when the pressure of the air flow on the vane reaches a predetermined minimum and when the throttle valve is closed.

CHARLES RUSSELL POST.